United States Patent
Wigren et al.

(10) Patent No.: US 11,974,236 B2
(45) Date of Patent: Apr. 30, 2024

(54) CONTROLLING TOTAL AVERAGE TRANSMISSION POWER OF A RADIO BASE STATION

(71) Applicant: Telefonaktiebolaget LM Ericsson (PUBL), Stockholm (SE)

(72) Inventors: Torbjörn Wigren, Uppsala (SE); Shiguang Guo, Kanata (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 340 days.

(21) Appl. No.: 17/612,016

(22) PCT Filed: May 29, 2019

(86) PCT No.: PCT/EP2019/063944
§ 371 (c)(1),
(2) Date: Nov. 17, 2021

(87) PCT Pub. No.: WO2020/239214
PCT Pub. Date: Dec. 3, 2020

(65) Prior Publication Data
US 2022/0240200 A1 Jul. 28, 2022

(51) Int. Cl.
*H04W 52/36* (2009.01)
*H04W 52/22* (2009.01)

(52) U.S. Cl.
CPC ....... *H04W 52/367* (2013.01); *H04W 52/225* (2013.01)

(58) Field of Classification Search
CPC ............. H04W 52/143; H04W 52/223; H04W 52/225; H04W 52/228; H04W 52/367
See application file for complete search history.

(56) References Cited

U.S. PATENT DOCUMENTS

2013/0143617 A1* 6/2013 Cea ..................... H04W 52/362
455/522
2014/0376430 A1 12/2014 Su et al.
(Continued)

FOREIGN PATENT DOCUMENTS

| CN | 101790853 A | 7/2010 |
| CN | 109792270 A | 5/2019 |

(Continued)

OTHER PUBLICATIONS

PCT International Search Report issued for International application No. PCT/EP2019/063944—dated Feb. 19, 2020.
(Continued)

*Primary Examiner* — Raymond S Dean
(74) *Attorney, Agent, or Firm* — Baker Botts L.L.P.

(57) ABSTRACT

There is provided mechanisms for controlling total average transmission power of a radio base station. A method is performed by a control device. The method comprises performing, for a current discrete time value t, control of total average transmission power $\{P_{tot}\}(t)$ of the radio base station according to a back-off power control loop. The total average transmission power $\{P_{tot}\}(t)$ is computed over an averaging time window T of the present value of momentary transmission power and the N−1 values of momentary transmission power preceding the present value of momentary transmission power. The method comprises evaluating, for a future discrete time value less than, or equal to, t+T, the total average transmission power, assuming that values of momentary transmission power for all discrete time values from t up to t+T, starting at the next discrete time value t+1, is limited to a minimum value of said momentary transmission power. The method comprises limiting the momentary transmission power to the minimum value for at least the next future discrete time value when the evaluated total average transmission power, for any of the future discrete (Continued)

time values, exceeds a power threshold value based on a regulatory limit.

18 Claims, 9 Drawing Sheets

(56) References Cited

U.S. PATENT DOCUMENTS

| | | | |
|---|---|---|---|
| 2015/0201387 A1* | 7/2015 | Khawand | H04W 52/265 |
| | | | 455/452.1 |
| 2016/0098053 A1 | 4/2016 | Khawand et al. | |
| 2020/0076462 A1* | 3/2020 | Yan | H04L 1/1887 |
| 2021/0029624 A1* | 1/2021 | Liu | H04W 74/0833 |
| 2022/0166478 A1* | 5/2022 | Wigren | H04W 72/0473 |
| 2022/0191803 A1* | 6/2022 | Wigren | H04B 17/102 |

FOREIGN PATENT DOCUMENTS

| | | |
|---|---|---|
| CN | 109792303 A | 5/2019 |
| WO | WO2009071797 A1 | 6/2009 |
| WO | 2018 002691 A1 | 1/2018 |

OTHER PUBLICATIONS

PCT Written Opinion of the International Searching Authority issued for International application No. PCT/EP2019/063944—dated Feb. 19, 2020.
Office Action issued for Chinese Patent Application Serial No. 201980096956.7—dated Nov. 1, 2023.
Search Report issued for Chinese Patent Application Serial No. 2019800969567—dated Oct. 23, 2023.

* cited by examiner

CONTROLLING TOTAL AVERAGE TRANSMISSION POWER OF A RADIO BASE STATION

PRIORITY

This nonprovisional application is a U.S. National Stage Filing under 35 U.S.C. § 371 of International Patent Application Serial No. PCT/EP2019/063944 filed May 29, 2019 and entitled "Controlling Total Average Transmission Power of A Radio Base Station" which is hereby incorporated by reference in its entirety.

TECHNICAL FIELD

Embodiments presented herein relate to a method, a control device, a computer program, and a computer program product for controlling total average transmission power of a radio base station.

BACKGROUND

When any radio equipment is to be deployed, regulatory radio frequency (RF) electromagnetic field (EMF) exposure requirements should be accounted for. These RF EMF exposure regulations may typically be based on the guidelines from the International Commission on Non-Ionizing Radiation Protection (ICNIRP) but may take different forms in some countries and regions. The aim of RF EMF exposure regulations is to ensure that human exposure to RF energy is kept within prescribed limits, which typically have been set with wide safety margins.

Some newly developed base stations and other radio equipment are equipped with so-called advanced antenna systems (AAS). These antenna systems increase the capacity and/or coverage compared to traditionally used antenna system by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS with a large number of antenna elements in order to achieve a high directivity, there may be a large maximum beamforming gain. A consequence of a large beamforming gain is typically that the radiated power is concentrated in directional beams, meaning that the Equivalent Isotropic Radiated Power (EIRP) rating of the base station, i.e. the power radiated from an antenna with unity antenna gain in all directions, is increased as compared to the situation without AAS.

The RF EMF exposure limitations are typically expressed in terms of the power density (in units of $W/m^2$) which in the far field is proportional to the EIRP. Consequently, the EIRP can be used to determine the power density in the far field. The ICNIRP and other RF EMF exposure limitations are usually expressed in terms of average power density over a specified averaging time interval T. This means that the momentary power density can be higher during a shorter time than T, however the time-averaged power density over any time period of duration T must be below the specified limit. To maintain a certain RF EMF compliance boundary or exclusion zone, that is smaller than what is obtained using the maximum EIRP of the AAS, the time-averaged total transmit power then needs to be controlled to be less than an average power threshold that is computed based on the RF exposure limitations and the selected exclusion zone. In cases where more than one power source share the same AAS or where several AASs are co-sited and aligned, the threshold may have to be computed in terms of the combined transmitted power or EIRP of the site.

Hence, there may be a need for efficient control of the average power or EIRP for base stations and other radio equipment.

SUMMARY

An object of embodiments herein is to provide efficient control of radio power sources of base stations and other radio equipment, so that certain RF EMF exclusion zones are maintained by the controlled time-averaged powers of the base stations and radio equipment.

This objective is generally solved by mechanisms performed by a control device for controlling total average transmission power of a radio base station.

According to a first aspect there is presented a method for controlling total average transmission power of a radio base station. The method is performed by a control device. The method comprises performing, for a current discrete time value t, control of total average transmission power $\langle P_{tot} \rangle(t)$ of the radio base station according to a back-off power control loop. The total average transmission power $\langle P_{tot} \rangle(t)$ is computed over an averaging time window T of the present value of momentary transmission power and the N−1 values of momentary transmission power preceding the present value of momentary transmission power. The method comprises evaluating, for a future discrete time value less than, or equal to, t+T, the total average transmission power, assuming that values of momentary transmission power for all discrete time values from t up to t+T, starting at the next discrete time value t+1, is limited to a minimum value of said momentary transmission power.

The method comprises limiting the momentary transmission power to the minimum value for at least the next future discrete time value when the evaluated total average transmission power, for any of the future discrete time values, exceeds a power threshold value based on a regulatory limit.

According to a second aspect there is presented a control device for controlling total average transmission power of a radio base station. The control device comprises processing circuitry. The processing circuitry is configured to cause the control device to perform, for a current discrete time value t, control of total average transmission power $\langle P_{tot} \rangle(t)$ of the radio base station according to a back-off power control loop. The total average transmission power $\langle P_{tot} \rangle(t)$ is computed over an averaging time window T of the present value of momentary transmission power and the N−1 values of momentary transmission power preceding the present value of momentary transmission power. The processing circuitry is configured to cause the control device to evaluate, for a future discrete time value less than, or equal to, t+T, the total average transmission power, assuming that values of momentary transmission power for all discrete time values from t up to t+T, starting at the next discrete time value t+1, is limited to a minimum value of said momentary transmission power. The processing circuitry is configured to cause the control device to limit the momentary transmission power to the minimum value for at least the next future discrete time value when the evaluated total average transmission power, for any of the future discrete time values, exceeds a power threshold value based on a regulatory limit.

According to a third aspect there is presented a control device for controlling total average transmission power of a radio base station. The control device comprises a control module configured to perform, fofa s t discrete time value t, control of total average transmission power $\langle P_{tot}\rangle(t)$ of the radio base station according to a back-off power control loop. The total average transmission power $\langle P_{tot}\rangle(t)$ is computed over an averaging time window T of the present value of momentary transmission power and the N−1 values of momentary transmission power preceding the present value of momentary transmission power. The control device comprises an evaluate module configured to evaluate, for a future discrete time value less than, or equal to, t+T, the total average transmission power, assuming that values of momentary transmission power for all discrete time values from t up to t+T, starting at the next discrete time value t+1, is limited to a minimum value of said momentary transmission power. The control device comprises a limit module configured limit the momentary transmission power to the minimum value for at least the next future discrete time value when the evaluated total average transmission power, for any of the future discrete time values, exceeds a power threshold value based on a regulatory limit.

According to a fourth aspect there is presented a computer program for controlling total average transmission power of a radio base station, the computer program comprising computer program code which, when run on a control device, causes the control device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these control devices, this computer program and this computer program product enable efficient control of the total average transmission power of the radio base station.

Advantageously this method, these control devices, this computer program and this computer program product enable the total average transmission power to always be within the regulatory limit.

Advantageously this method, these control devices, this computer program and this computer program product require only a comparatively low computational complexity for controlling the total average transmission power of the radio base station.

Other objectives, features and advantages of the enclosed embodiments will be apparent from the following detailed disclosure, from the attached claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
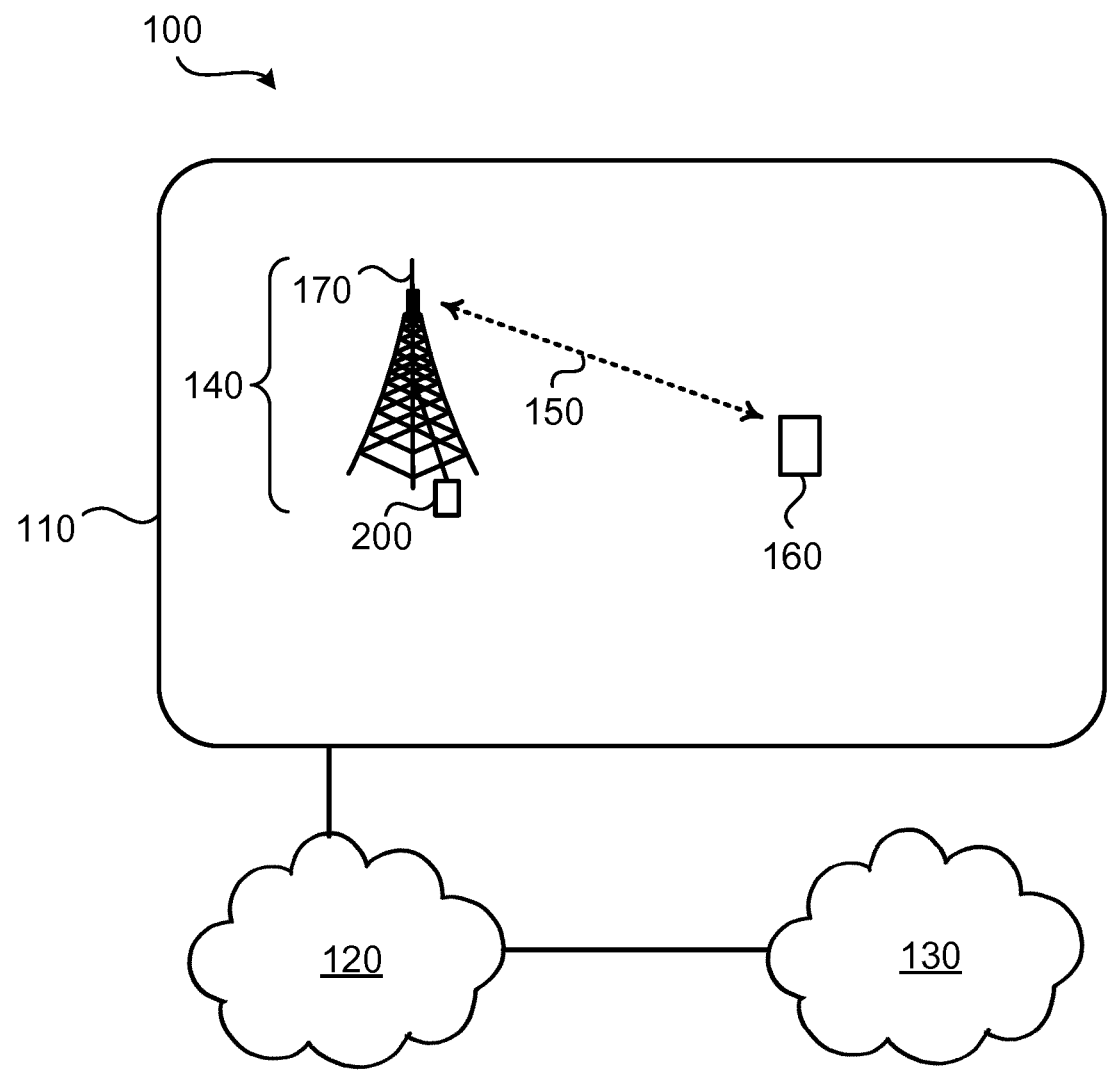
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a control device 200 configured to control a radio base station 140 that, via a transmission and reception point (TRP) 170 comprising an antenna array, provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the radio base station 140, access services of, and exchange data with, the service network 130.

Examples of radio base stations 140 are radio access network nodes, base transceiver stations, Node Bs, evolved Node Bs, gNBs, access points, and access nodes, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The control device 200 might comprise, be collocated with, integrated with, or be in operational communications with, the radio base station 140.

Figure 2:
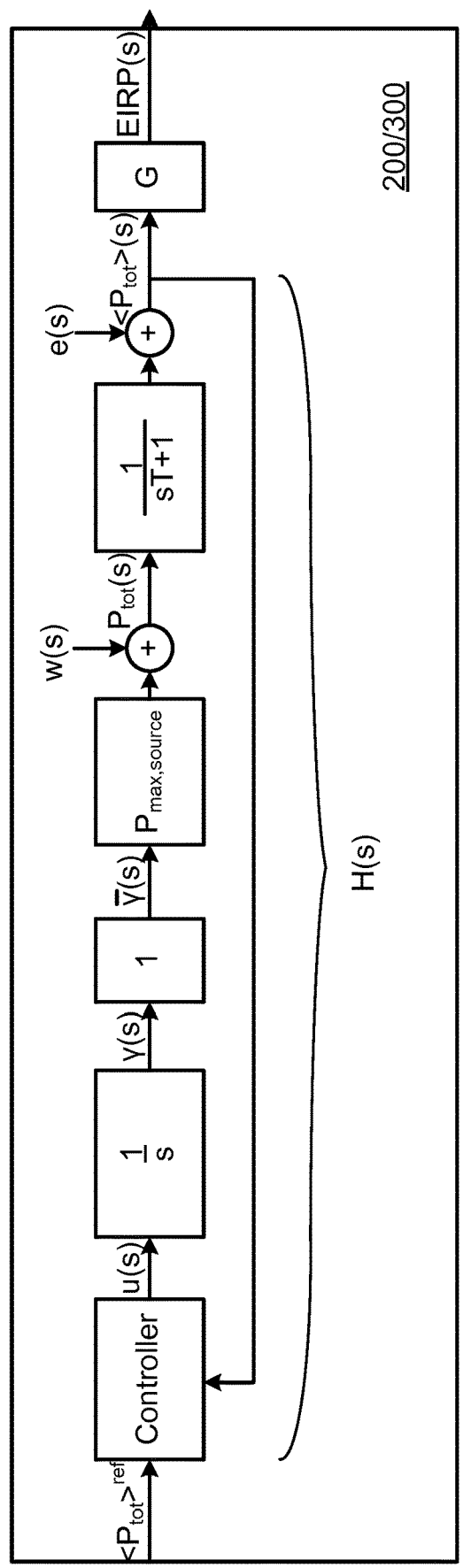
FIG. 2 is a block diagram of a control device according to an embodiment.

FIG. 2 is a block diagram of the control device 200 where feedback control has been enabled by a feedback control loop, in this disclosure denoted a back-off power control loop. In FIG. 2, $\langle P_{tot}\rangle^{ref}$ denotes the setpoint for the averaged power (typically slightly less than the computed threshold value for the averaged power, which shall not be exceeded), 1/s denotes the actuator dynamics with lower and upper limits inactive, $\bar{\gamma}(t)$ denotes the scheduler limitation after lower and upper limitation (inactive in FIG. 2), and $P_{max,site}$ denotes the maximal momentary total power of the radio transmitter of the radio base station 140. Further, w(s) denotes a disturbance representing predicted power errors, 1/(sT+1) represents an autoregressive simplified model of the averaging, $\langle P_{tot} \rangle(s)$ denotes the averaged total power, and e(s) denotes a measurement disturbance. All quantities are in FIG. 2 expressed in the Laplace transform domain, which is allowed since the feedback control mechanism design is performed with constraints inactive. Neither w(s) nor e(s) are a part of the herein disclosed inventive concept, but are only shown to provide a model for controller design.

In some aspects the controller block is given by:

$$u(s)=CT(1+T_D s)(\langle P_{tot} \rangle^{ref} - \langle P_{tot} \rangle(s)).$$

Here, u(s) is the control signal. A controller implementing this controller block is of proportional-derivative (PD) type. C denotes the proportional gain, and $T_D$ the differentiation time.

The poles of the closed loop system of FIG. 2 are given by the following second order equation:

$$s^2 + (1/T + P_{max,site} CT_D)s + P_{max,site}C = 0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as:

$$s^2 + (\alpha_1 + \alpha_2)s + \alpha_1 \alpha_2 = 0.$$

An identification of coefficients and solution of the resulting system of equations reveal that the proportional gain and differentiation time shall be selected as:

$$C = \frac{\alpha_1 \alpha_2}{P_*},$$

and $$T_D = \frac{\alpha_1 + \alpha_2 - \frac{1}{T}}{\alpha_1 \alpha_2}.$$

A reason for this choice is that a system with two negative real poles can be expected to be well damped, which is a result of a significant differentiation action.

To implement the feedback control mechanism, $\langle P_{tot} \rangle^{ref}$, $\langle P_{tot} \rangle(t)$ and $\langle \dot{P}_{tot} \rangle(t)$ are needed. The first two quantities can be obtained by configuration and averaging of values of measured momentary powers, while the second quantity needs to be estimated. This can e.g. be achieved by autoregressive filtering of $\langle P_{tot} \rangle(t)$ with the filter:

$$\langle \dot{P}_{tot} \rangle(s) = \frac{\alpha s}{s + \alpha} \langle P_{tot} \rangle(s),$$

where $\alpha$ is a filter parameter.

In order to further emphasize the back-off control performance it could be advisable to only allow differential control action that reduces the scheduler threshold $\gamma(t)$, meaning that only negative contributions from the second term of the feedback mechanism should be allowed. This means that in the time domain, the following restriction to the derivative $\langle \dot{P}_{tot} \rangle(t)$ might be applied:

$$u(t)=CTe(t) - CTT_D \max(0, \dot{e}(t)).$$

Figure 3:
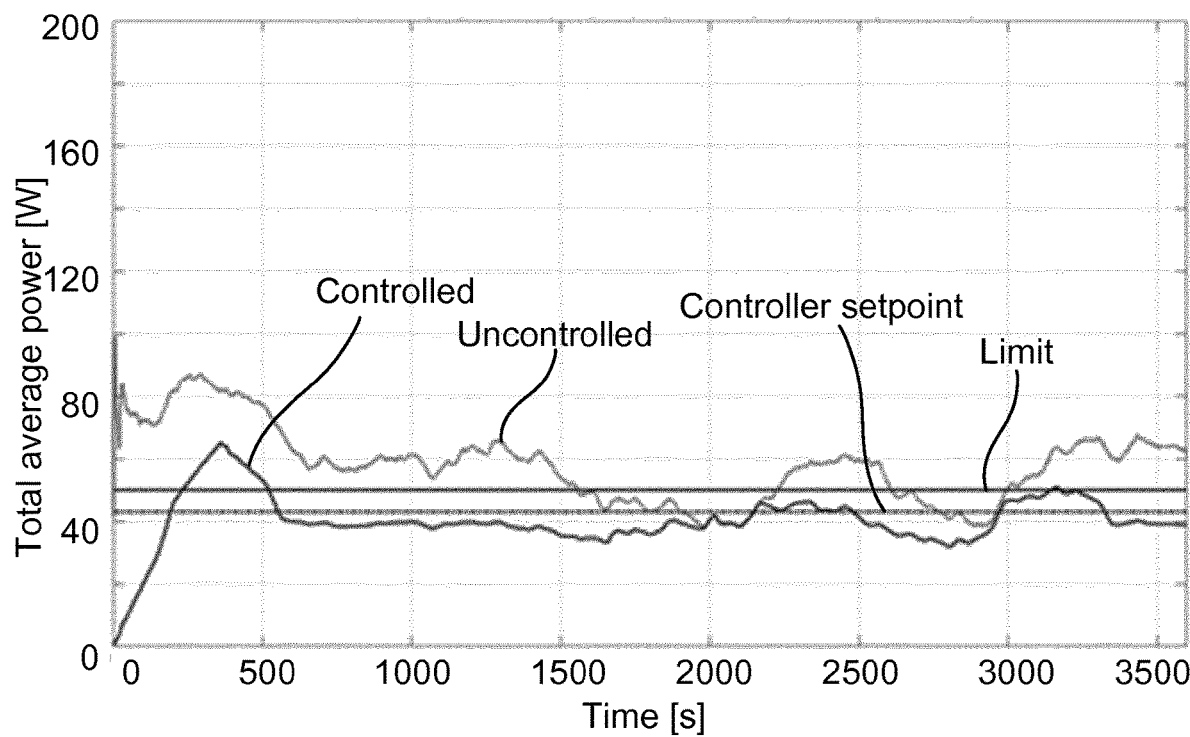
FIGS. 3, 7, and 8, show simulation results according to embodiments

In some scenarios there might be a need to guarantee algorithmically that the regulated time-averaged power is always below the power threshold computed based on the designed RF EMF compliance boundary (exclusion zone) of the site. The functionality described above does not necessarily have this property. This is because linear control, such as PD control, is not designed to provide such guarantees. They only fallback to use a fraction $\gamma_{low}$ of the maximum momentary transmission power in case the regulated average power gets very close to the threshold that is not to be exceeded. As shown in FIG. 3, there may still be overshoots. FIG. 3 shows an example of controlling total average transmission power of the radio base station 140 according to the back-off power control loop of FIG. 2. One reason for this effect is that when the averaging window for some reason is first filled with very low values of momentary transmission power, followed by values of very high momentary transmission power for say 1.5 minutes, the total average transmission power reaches a level close to the threshold. During the remaining averaging time up to T there are nonzero values of momentary transmission power entering the averaging window, due e.g. to transmission of control signalling, that leads to an increased total average transmission power, since the very low values of momentary transmission power in the averaging window initially are shifted out. Hence an overshoot cannot be prevented. This is admittedly a rare situation—however since it can occur, at least theoretically, it can be expected to be a regulator and operator non-negotiable requirement to implement algorithms that prevents this behavior with a 100% guarantee.

The embodiments disclosed herein therefore relate to mechanisms for controlling total average transmission power of a radio base station 140. In order to obtain such mechanisms there is provided a control device 200, a method performed by the control device 200, a computer program product comprising code, for example in the form of a computer program, that when run on a control device 200, causes the control device 200 to perform the method.

Figure 4:
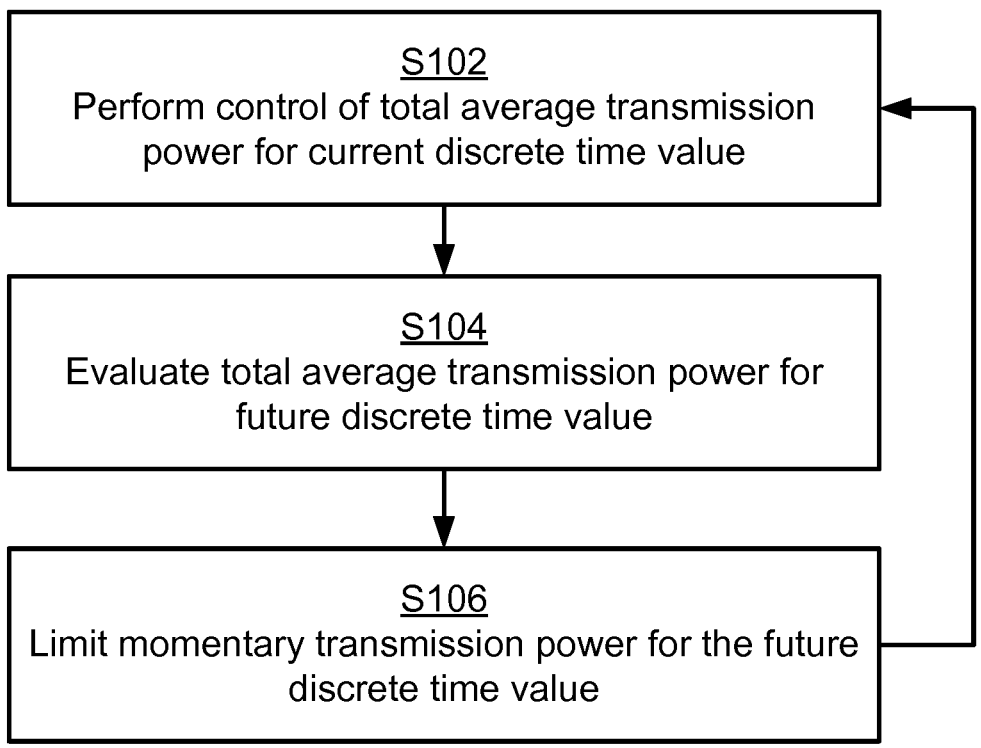
FIGS. 4, and 6 are flowcharts of methods according to embodiments.

FIG. 4 is a flowchart illustrating embodiments of methods for controlling total average transmission power of a radio base station 140. The methods are performed by the control device 200. The methods are advantageously provided as computer programs 1120.

S102: The control device 200 performs, for a current discrete time value t, control of total average transmission power $\langle P_{tot} \rangle(t)$ of the radio base station 140 according to a back-off power control loop. The total average transmission power $\langle P_{tot} \rangle(t)$ is computed over an averaging time window T of the present value of momentary transmission power and the N−1 values of momentary transmission power preceding the present value of momentary transmission power.

S104: The control device 200 evaluates, for a future discrete time value less than, or equal to, t+T, the total average transmission power. The total average transmission power is evaluated assuming that values of momentary transmission power for all discrete time values from t up to t+T, starting at the next discrete time value t+1, is limited to a minimum value of said momentary transmission power.

S106: The control device 200 limits the momentary transmission power to the minimum value for at least the next future discrete time value when the total evaluated average transmission power, for any of the future discrete time values, exceeds a power threshold value. The power threshold value is based on a regulatory limit.

S102 might then be entered for the discrete time value following the current discrete time value, i.e., for t+1.

Embodiments relating to further details of controlling total average transmission power of a radio base station 140 as performed by the control device 200 will now be disclosed.

There could be different types of back-off power control loops. One example of a back-off power control loop has been described above with reference to FIG. 2. Thus, in some examples, in the back-off power control loop, a setpoint value $\langle P_{tot}\rangle^{ref}$ of the total average transmission power is compared with a value of the total average transmission power $\langle P_{tot}\rangle(t)$.

There could be different points in time when the evaluating and the limiting as in S104 and S106 are performed. In some aspects, the check is performed for every k:th value of future discrete times. In particular, according to an embodiment, the evaluating is performed per every k:th value, where 1<k<, of the future discrete time.

There could be different definitions of the minimum value of the momentary transmission power. In some embodiments, the minimum value is defined as $\alpha P_{max,site}$, where $\alpha \in [0,1]$, and where $P_{max,site}$ is the maximum transmission power of the radio base station 140.

There could be different definitions of the power threshold value. In some embodiments, the power threshold value is defined as $\varepsilon P_{max,site}-e$, where $\varepsilon$ is a limit based on the average EIRP threshold determined to obtain a certain RF EMF exclusion zone, and where e is a margin value.

In some examples the N values of momentary transmission power $P_{tot}(t)$ for $t=t_0, t_0-T_S, \ldots, t_0-(N-1)T_S$ are within the averaging time window T for a value of momentary transmission power with time index $t_0$, and with sampling time $T_S$. The control of the total average transmission power might then be limited when any $\langle P_{tot}\rangle(t_0+iT_S)>\varepsilon P_{max,site}-e$, for $i=1, \ldots, N$.

There could be different ways to evaluate the total average transmission power in S104. In some embodiments, the total average transmission power per each of the N future discrete time values is recursively evaluated. For example, for every value $1<i<N-1$ of the N future discrete time values, the average transmission power of index i+1 is evaluated before the average transmission power of index i. Further, in some embodiments, the N values of average transmission power $\langle P_{tot}\rangle(t_0+iT_S)$, for a position of the averaging time window corresponding to future discrete time values $i=1, \ldots, N$, are recursively determined from i=N down to i=1.

There could be different ways to start the recursive determination (i.e., when i=N) per each of the N future discrete time values. According to an example, for i=N:

$$\langle P_{tot}(t_0+NT_S)\rangle = \alpha P_{max,site}.$$

There could be different ways to continue the recursive determination (i.e., when i<N). According to an example, for N>i≥0:

$$\langle P_{tot}\rangle(t_0+iT_S) = \frac{iaP_{max,site}+P_{tot}(t_0)+\ldots+P_{tot}(t_0+(i-(N-1))T_S)}{N}.$$

There could be different ways to control the average output power of the radio base station 140 for the future discrete time value. In some embodiments, the average output power of the radio base station 140 is controlled by a resource factor value $\gamma(t)$. In some examples the control of the total average transmission power is obtained by limiting the momentary transmission power to the minimum value by setting the resource factor value $\gamma(t)$ to its lower limit value $\gamma_{hardlimit}$, where $\gamma_{hardlimit} \in [0,1]$. There could be different types of resource factor values. In some examples, the resource factor value $\gamma(t)$ corresponds to which fraction of total number of physical resource blocks (PRBs) to schedule for the current discrete time value.

In view of the above, it is assumed that the values of momentary transmission power currently in the sliding window now will affect the total average transmission power a duration T (such as T minutes, where T=6 in some examples) ahead in time. Any action taken to avoid overshoot of the current value of momentary transmission power, needs to be evaluated for the coming duration T ahead in time to guarantee that there cannot be an overshoot due to the values of momentary transmission power currently in the sliding window.

Given a current time $t_0$, a power profile $P_{tot}(t)$, $t=t_0, \ldots, t_0-(N-1)T_S$ representing values of momentary transmission power currently in the sliding window, and a minimum controlled momentary transmission power of $\alpha P_{max,site}$, where $\alpha \in [0,1]$, then an estimate of the maximum possible total average transmission power during the coming T time period (N samples), i.e. for $t=t_0+T_S, \ldots, t_0+NT_S$, provided that regulation at future times is performed to limit the momentary transmission power to be less than or equal $\alpha P_{max,site}$ could be used to efficiently avoid an overshoot of the total average transmission power during the coming T time period.

Then, if any $\langle P_{tot}\rangle(t_0+iT_S)>\varepsilon P_{max,site}-e$, for $i=1, \ldots, N$, set $\gamma(t)=\gamma_{hardlimit}$. As above, $\varepsilon$ is the relative EIRP threshold, determined from the selected RF EMF exclusion zone and $\gamma_{hardlimit} \in [0,1]$ is the hardlimit fraction of PRBs that can be scheduled, and e is a pre-configured margin.

Figure 5:
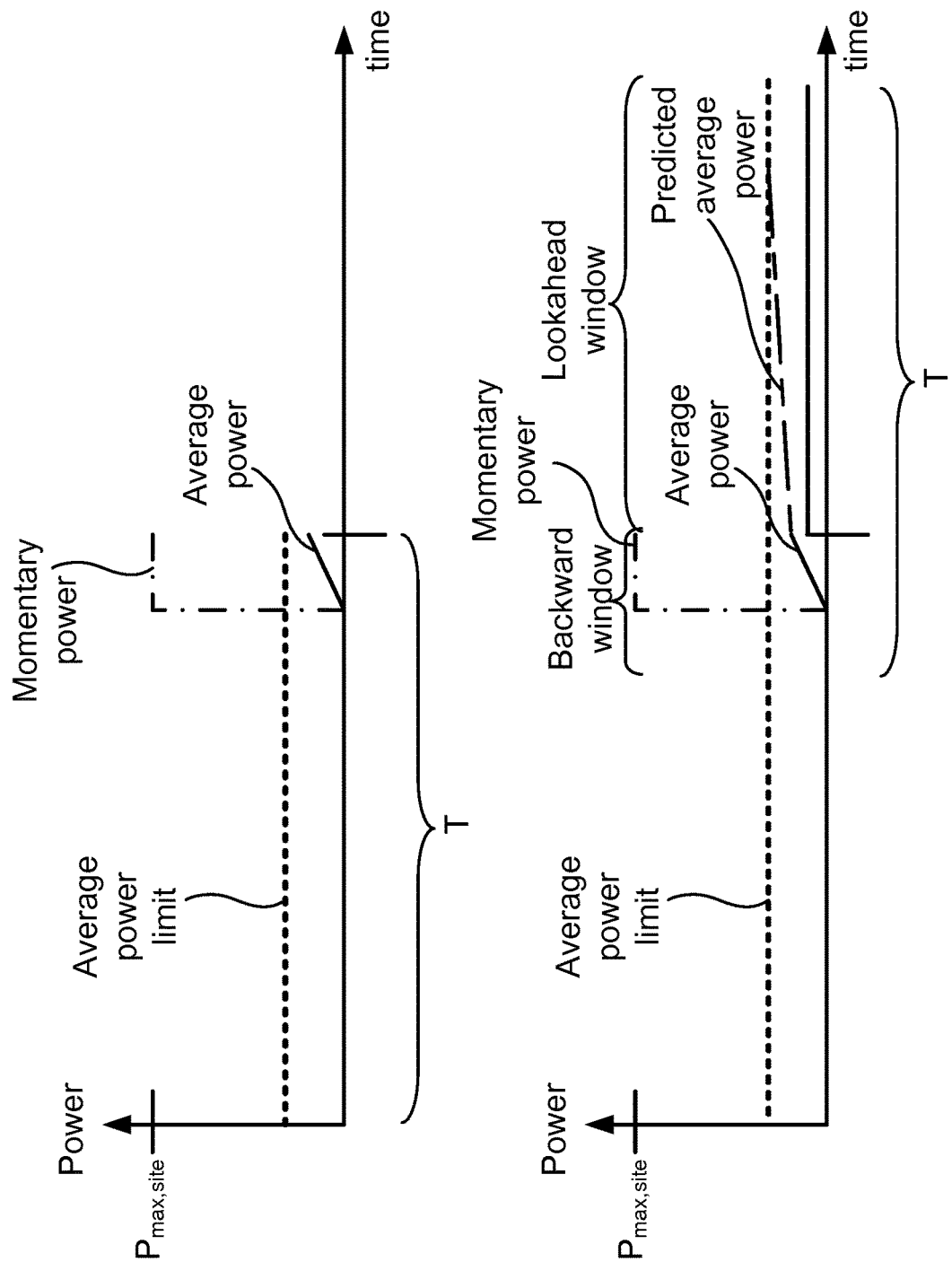
FIG. 5 schematically illustrates averaging windows according to embodiments.

With reference to FIG. 5, one efficient way to compute the total average transmission power for future times is to start by locating the lookahead window to predict a maximum of T ahead in time. In such a situation, there is no contribution from the backward window. Then the windows are moved one sample, leading to a recursive computation of the sought average power $\langle P_{tot}\rangle(t_0+iT_S)$, for $i=1, \ldots, N$.

It follows first that:

$$\langle P_{tot}(t_0+NT_S)\rangle = \frac{NaP_{max,site}}{N} = aP_{max,site}.$$

Then, for the window positions indexed by N>i≥0, it follows that:

$$\langle P_{tot}\rangle(t_0+iT_S) = \frac{iaP_{max,site}+P_{tot}(t_0)+\ldots+P_{tot}(t_0+(i-(N-1))T_S)}{N}.$$

It is noted that the contribution from the backward window contains the N−i last values of momentary transmission power, for N>i≥0. This means that the sum of the contributions from the backward window can be recursively computed. For example, define the backward accumulated power as:

$$P_{backward,i} = P_{backward}(t_0+(i-(N-1))T_S,$$
$$= P_{tot}(t_0)+\ldots+P_{tot}(t_0+(i-(N-1))T_S)).$$

This quantity can be recursively computed as follows:

```
Start
P_backward,N = 0
i = N
While i>2
   i - -
   P_backward,i = P_backward,i+1 + P_tot(t_0 + (i − (N − 1))T_S))
End
```

Here the notation "i--" denotes a decrease of i with one unit. The complete recursive algorithm for evaluation of future average power, together with the computation of the Boolean used to predictively trigger use of the hard limitation when performing the back-off power control loop, for all discrete time values up to T discrete time values ahead in time can therefore be formulated as follows, as also illustrated in the flowchart 600 of FIG. 6:

```
Start
P_backward,N = 0

⟨P_tot⟩(t_0 + NT_S) = (N a P_max,site)/N = a P_max,site

MPCtrigger = false
i = N
while i>2 & ~MPCtrigger
   i - -
   P_backward,i = P_backward,i+1 + P_tot(t_0 + (i − (N − 1))T_S))

⟨P_tot⟩(t_0 + iT_S) = (i a P_max,site + P_backward,i)/N

If ⟨P_tot⟩ (t_0 + iT_S) > εP_max,site − e
   MPCtrigger = true
End
End
```

Here the notation "~MPCtrigger" denotes that the value of MPCtrigger is false.

Figure 6:
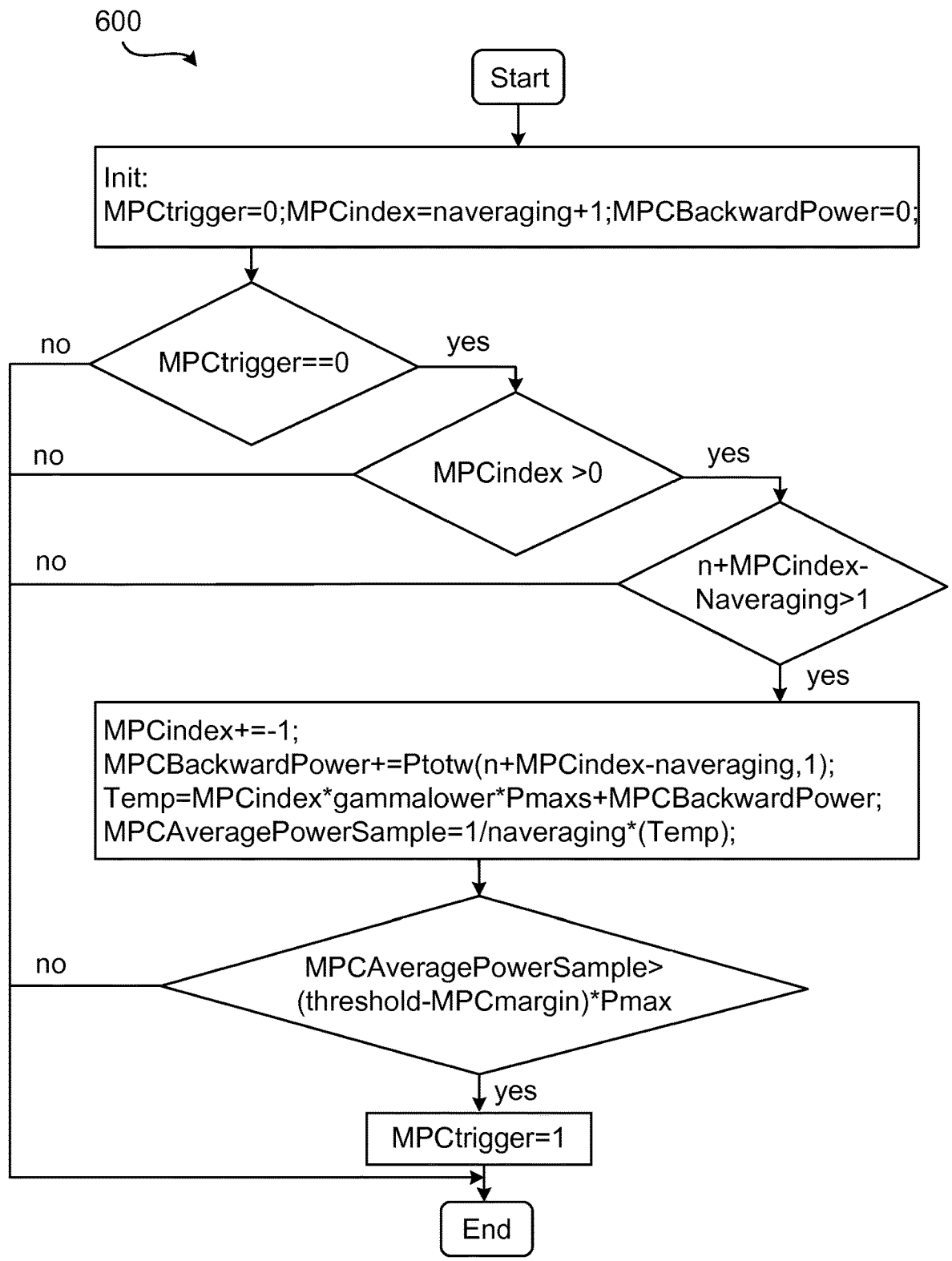

The notation of FIG. 6 relates to the above algorithm as follows (differences are listed):
MPCindex corresponds to i,
Naveraging=naveraging corresponds to N
MPCBackwardPower corresponds to $P_{backward,i}$
Ptotw corresponds to $P_{tot}$, i.e. the momentary power.
gammalower corresponds to $\gamma_{\gamma hardlimit}$ or α
Pmaxs and Pmax correspond to $P_{max,site}$
Temp is a temporary variable, only used in FIG. 6.
MPCAveragePowerSample corresponds to ⟨$P_{tot}$⟩(t_0+iT_S)
Threshold corresponds to ε
MPCmargin*Pmax corresponds to e.

There could be different ways to implement usage of the hard limitation when performing the back-off power control loop (once the hard limitation has been triggered; i.e., when MPCtrigger has been set to true). One conservative approach is given by:

```
Start
If <P_tot>(t) > εP_max,site margin or MPCtrigger == true
hardlimit = true
End
If <P_tot>(t) < δ_1 εP_max,site and MPCtrigger == false
hardlimit = false
End
End
```

Here margin is a value slightly lower than 1; for example typically margin=0.95. In this way the use of the hard limitation will be triggered more often than when only level-based triggering is used. Another way to implement usage of the hard limitation is to discard the level-based triggering altogether. That is:

```
Start
If MPCtrigger == true
hardlimit = true
End
If MPCtrigger == false
hardlimit = false
End
End
```

As the skilled person understands, yet further alternatives are possible.

Figure 7:
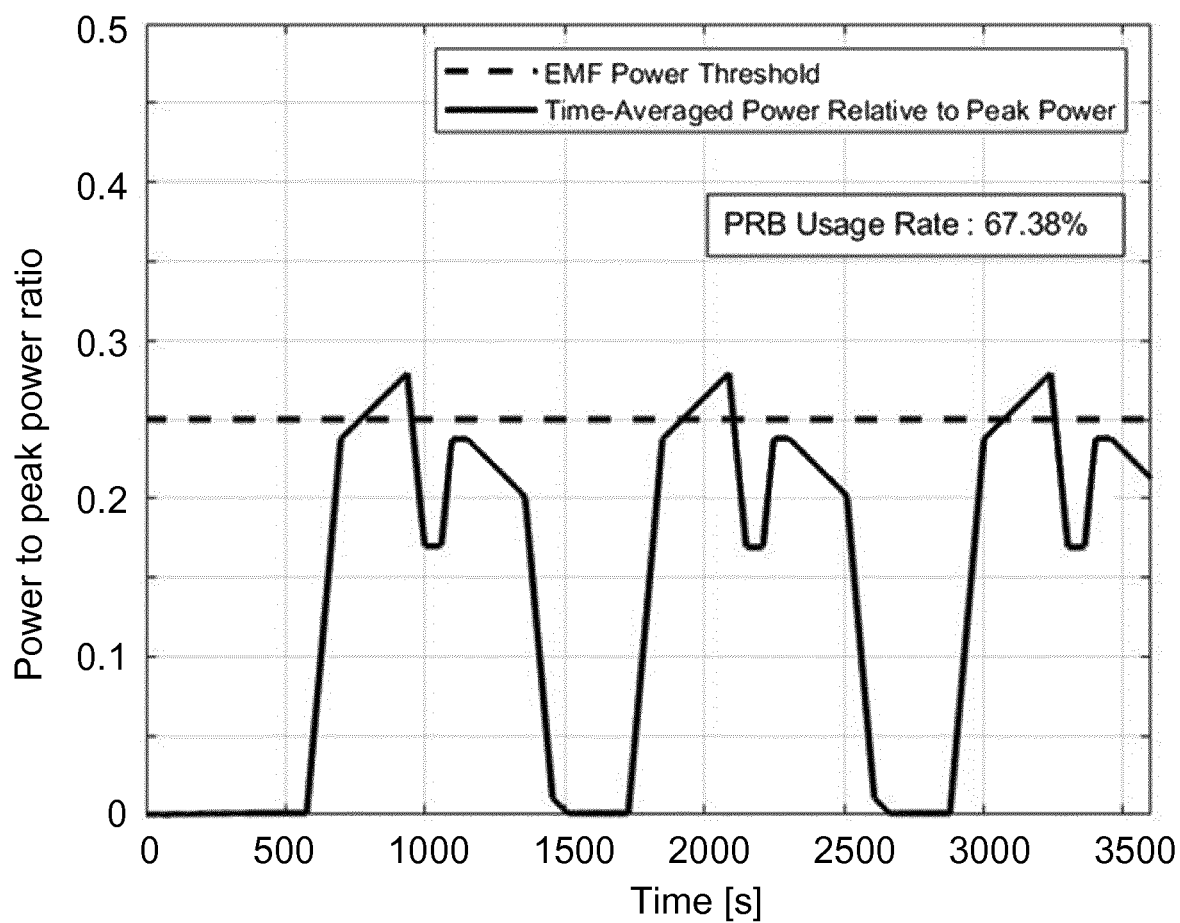
Figure 8:
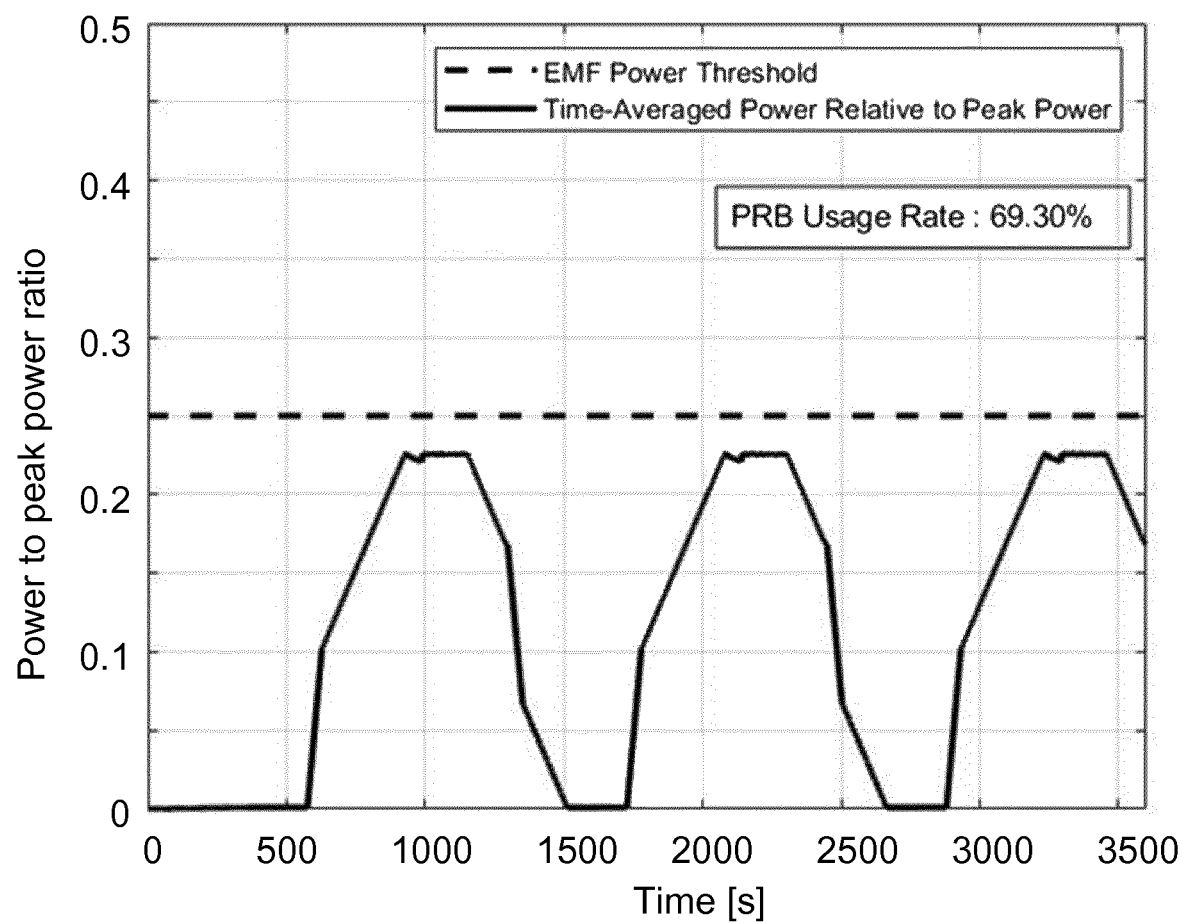

Simulation results will now be shown with reference to FIG. 7 and FIG. 8. FIG. 7 shows the result of a simulation of the total average transmission power without application of the herein disclosed embodiments. FIG. 8 shows the result of a simulation of the total average transmission power with application of the herein disclosed embodiments. From these figures follow that application of the herein disclosed embodiments consistently prevents the overshoots of the power threshold and also yields a higher PRB usage rate, which influences throughput and capacity.

Another approach to control the total average transmission power of the radio base station 140 to always keep the total average transmission power below the determined power threshold is to directly apply model predictive control (MPC). Such a direct approach could then constrain the total average transmission power to be below the power threshold computed from the selected RF EMF exclusion zone. An exact solution would require introduction of all samples in the averaging window as state components in a state vector, typically having a dimension of several hundreds (say, 600 when T=6 minutes). A medium complexity solution requires that the exponential model of the averaging process is used, which would then result in guarantees that are not 100%. A brief description of such an approach is given below.

An MPC control problem is defined by the state model, a cost function and constraints. The state model is here assumed to consist of states for exponential averaging and the dynamic actuator, i.e.

$$\frac{d}{dt}\langle P_{tot}\rangle(t) = -\frac{1}{T}\langle P_{tot}\rangle(t) + \frac{1}{T}P_{max,site}\gamma(t),$$

$$\frac{d}{dt}\gamma(t) = u(t).$$

This assumes that limitation of PRBs is active. The constraints are: $\gamma_{low} \leq \gamma(t) \leq 1$ and ⟨$P_{tot}$⟩(t)≤ε $P_{max,site}$ −e.

The cost function J could e.g. be selected to be quadratic. For example, one example of a cost function J is given by:

$$J = \int_{t_0}^{t_0+T_{look\,ahead}} \left(\langle P_{tot}\rangle^{ref}(\tau) - \langle P_{tot}\rangle(\tau)\right)^2 d\tau.$$

The skilled person would understand how to solve this problem, e.g. by consultation of one of many textbooks on MPC control.

Figure 9:
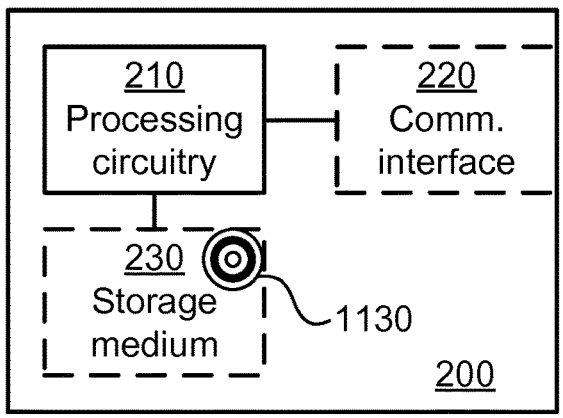
FIG. 9 is a schematic diagram showing functional units of a control device according to an embodiment.

FIG. 9 schematically illustrates, in terms of a number of functional units, the components of a control device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices, such as the radio base station 140. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

Figure 10:
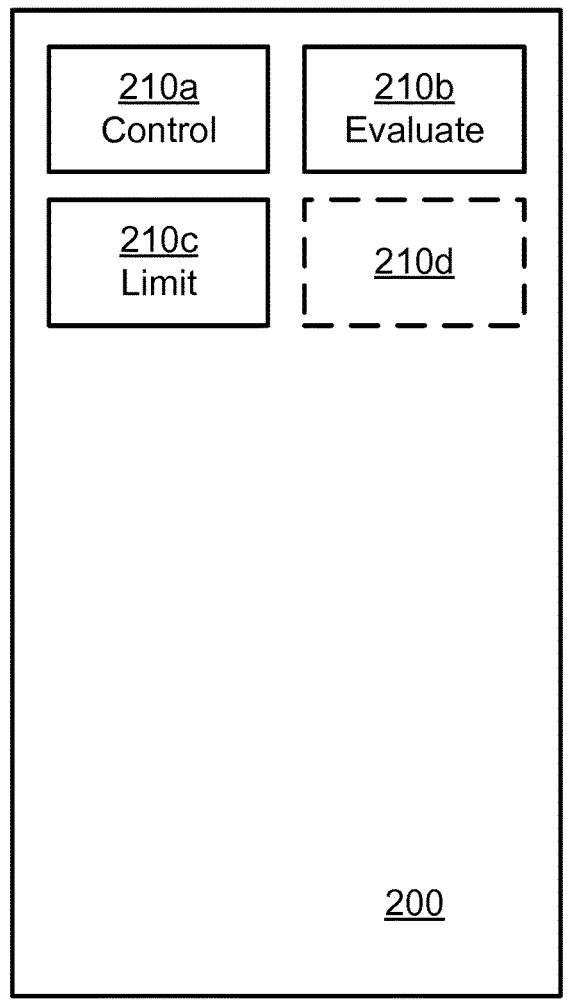
FIG. 10 is a schematic diagram showing functional modules of a control device according to an embodiment.

FIG. 10 schematically illustrates, in terms of a number of functional modules, the components of a control device 200 according to an embodiment. The control device 200 of FIG. 10 comprises a number of functional modules; a control module 210a configured to perform step S102, an evaluate module 210b configured to perform step S104, and a limit module 210c configured to perform step S106. The control device 200 of FIG. 10 may further comprise a number of optional functional modules, such as symbolized by functional module 210d. In general terms, each functional module 210a-210d may in one embodiment be implemented only in hardware and in another embodiment with the help of software, i.e., the latter embodiment having computer program instructions stored on the storage medium 230 which when run on the processing circuitry makes the control device 200 perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The control device 200 may be provided as a standalone device or as a part of at least one further device. For example, the control device 200 may be provided in a node of the radio access network 110 or in a node of the core network 120. Alternatively, functionality of the control device 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the control device 200 may be executed in a first device, and a second portion of the of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 9 the processing circuitry 210 may be distributed among a plurality of devices, or nodes. The same applies to the functional modules 210a-210d of FIG. 10 and the computer program 1120 of FIG. 11.

Figure 11:
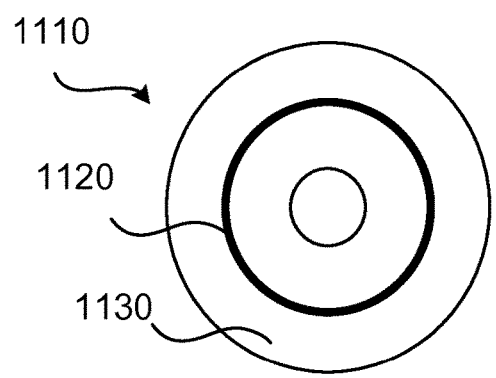
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended claims.

The invention claimed is:

1. A method for controlling total average transmission power of a radio base station, the method being performed by a control device, the method comprising:
  performing, for a current discrete time value t, control of total average transmission power $\langle P_{tot}\rangle(t)$ of the radio base station according to a back-off power control loop, wherein the total average transmission power $\langle P_{tot}\rangle(t)$ is computed over an averaging time window T of a present value of momentary transmission power and N−1 values of momentary transmission power preceding the present value of momentary transmission power;
  evaluating, for a future discrete time value less than, or equal to, t+T, the total average transmission power, under the assumption that values of momentary transmission power for all discrete time values from t up to t+T, starting at the future discrete time value t+1, are limited to a minimum value of said momentary transmission power; and
  limiting the momentary transmission power to the minimum value for at least the next future discrete time value when the evaluated total average transmission power, for any of the future discrete time values, exceeds a power threshold value based on a regulatory limit.

2. The method according to claim 1, wherein the evaluating is performed per every k:th value, where 1<k<N, of the future discrete times.

3. The method according to claim 1, wherein the minimum value is defined as $\alpha P_{max,site}$, where $\alpha \in [0,1]$, and where $P_{max,site}$ is the maximum transmission power of the radio base station.

4. The method according to claim 1, wherein the power threshold value is defined as $\varepsilon P_{max,site}-e$, where $\varepsilon$ is a limit based on the average EIRP threshold determined to obtain a certain RF EMF exclusion zone, where $P_{max,site}$ is the maximum transmission power of the radio base station, and where e is a margin value.

5. The method according to claim 1, wherein the N values of momentary transmission power $P_{tot}(t)$ for $t=t_0$, $t_0-T_S$, ..., $t_0-(N-1)T_S$ are within the averaging time window T for a value of momentary transmission power with time index $t_0$, and with sampling time $T_S$.

6. The method according to claim 1, where the control of the total average transmission power is limited when any $\langle P_{tot}\rangle(t_0+iT_S) > \varepsilon P_{max,site}-e$, for i=1, ..., N.

7. The method according claim 1, wherein the total average transmission power per each of the N said future discrete time values is recursively evaluated.

8. The method according to claim 1, wherein, for every value 1<i<N−1 of the N future discrete time values, the average transmission power of index i+1 is evaluated before the average transmission power of index i.

9. The method according to claim 5, wherein the N values of average transmission power $\langle P_{tot}\rangle(t_0+iT_S)$, for a position of the averaging time window corresponding to future discrete time values i=1, ..., N, are recursively determined from i=N down to i=1.

10. The method according to claim 9, wherein for i=N:
$$\langle P_{tot}(t_0+NT_S)\rangle = \alpha P_{max,site}.$$

11. The method according to claim 9, wherein, for N>i≥0:

$$\langle P_{tot}\rangle(t_0+iT_S) = \frac{i\alpha P_{max,site} + P_{tot}(t_0) + \ldots + P_{tot}(t_0+(i-(N-1))T_S))}{N}.$$

12. The method according to claim 1, wherein the average output power of the radio base station is controlled by a resource factor value $\gamma(t)$.

13. The method according to claim 1, wherein the control of the total average transmission power is obtained by limiting the momentary transmission power to the minimum value by setting the resource factor value $\gamma(t)$ to its lower limit value $\gamma_{hardlimit}$, where $\gamma_{hardlimit} \in [0,1]$.

14. The method according to claim 13, wherein the resource factor value $\gamma(t)$ corresponds to which fraction of total number of PRBs to schedule for the current discrete time value.

15. The method according to claim 1, wherein the control is of proportional-derivative, PD, type.

16. The method according to claim 1, wherein the control is of derivative, D, type.

17. A control device for controlling total average transmission power of a radio base station, the control device comprising processing circuitry, the processing circuitry being configured to cause the control device to:
  perform, for a current discrete time value t, control of total average transmission power $\langle P_{tot}\rangle(t)$ of the radio base station according to a back-off power control loop, wherein the total average transmission power $\langle P_{tot}\rangle(t)$ is computed over an averaging time window T of a present value of momentary transmission power and N−1 values of momentary transmission power preceding the present value of momentary transmission power;
  evaluate, for a future discrete time value less than, or equal to, t+T, the total average transmission power, under the assumption that values of momentary transmission power for all discrete time values from t up to t+T, starting at the future discrete time value t+1, are limited to a minimum value of said momentary transmission power; and
  limit the momentary transmission power to the minimum value for at least the next future discrete time value when the evaluated total average transmission power, for any of the future discrete time values, exceeds a power threshold value based on a regulatory limit.

18. A non-transitory machine readable storage medium comprising a computer program for controlling total average transmission power of a radio base station, the computer program comprising computer code which, when run on a processing circuitry of a control device, causes the control device to perform operations to control total average transmission power of a radio base station comprising:
  performing, for a current discrete time value t, control of total average transmission power $\langle P_{tot}\rangle(t)$ of the radio base station according to a back-off power control loop, wherein the total average transmission power $\langle P_{tot}\rangle(t)$ is computed over an averaging time window T of a present value of momentary transmission power and N−1 values of momentary transmission power preceding the present value of momentary transmission power;
  evaluating, for a future discrete time value less than, or equal to, t+T, the total average transmission power, under the assumption that values of momentary transmission power for all discrete time values from t up to t+T, starting at the future discrete time value t+1, are limited to a minimum value of said momentary transmission power; and
  limiting the momentary transmission power to the minimum value for at least the next future discrete time value when the evaluated total average transmission power, for any of the future discrete time values, exceeds a power threshold value based on a regulatory limit.

* * * * *